United States Patent [19]

Dausinger et al.

[11] 4,414,038

[45] Nov. 8, 1983

[54] LASER BEAM SURFACE TREATMENT PROCESS FOR MATERIALS OF LARGE REFLECTIVITY

[75] Inventors: Friedrich Dausinger, Stuttgart; Werner Müller, Schwieberdingen, both of Fed. Rep. of Germany; Peter Arnold, Westendstrasse 11, 8000 München 2, Fed. Rep. of Germany

[73] Assignee: Peter Arnold, Munich, Fed. Rep. of Germany

[21] Appl. No.: 396,138

[22] Filed: Jul. 7, 1982

[30] Foreign Application Priority Data

Jul. 8, 1981 [DE] Fed. Rep. of Germany ....... 3126953

[51] Int. Cl.$^3$ .................................................. B23K 26/00
[52] U.S. Cl. ........................................ 148/4; 148/13; 219/121 L; 219/121 LM
[58] Field of Search ................................ 148/4, 1, 13; 219/121 LM, 121 LA, 121 LU, 121 LV, 121 L, 121 LY

[56] References Cited

U.S. PATENT DOCUMENTS 3,848,104 11/1974 Locke ................................... 148/13
4,157,923 6/1979 Yen et al. .............................. 148/4
4,304,978 12/1981 Saunders .......................... 219/121 L

OTHER PUBLICATIONS

K. Jain, *Controlled Laser Annealing by Raman Frequency Feedback* IBM Technical Disclosure Bulletin, vol. 24, No. 8, Jan. 1982.

*Primary Examiner*—M. J. Andrews
*Assistant Examiner*—S. Kastler
*Attorney, Agent, or Firm*—Frishauf, Holtz, Goodman & Woodward

[57] ABSTRACT

Directing a laser beam at a surface to be treated, such as a metallic surface which is likely to reflect much of the energy, results in a high proportion of absorbed energy if the laser beam has an oblique incidence, particularly if the laser beam is polarized in a direction parallel to the plane of incidence (defined as the plane which contains the axis of the laser beam and the perpendicular to the surface at the center of the spot of incidence). In the case of iron and steel surfaces the absorbtion is markedly increased at angles of incidence greater than 45° and just short of glancing incidence, with a maximum near 80°.

2 Claims, 2 Drawing Figures

LASER BEAM SURFACE TREATMENT PROCESS FOR MATERIALS OF LARGE REFLECTIVITY

The invention concerns a process for surface treatment of work pieces by means of a laser beam in which the laser beam and/or the work piece are guided in relative movement so as to control the duration of impingement of the beam on the work piece and the portions of the surface treated.

With the introduction of power lasers, new processes have become known for treating the surfaces of materials with laser rays. The laser radiation is in these cases partly absorbed, the surface heats up and the underlying portions of the material surface are, to a limited extent, heated up also by the heat conductivity of the material. According to the power density of the laser radiation and the duration of exposure thereto the material becomes incandescent, liquid or vaporized. The corresponding technical processes are, in the first case, hardening and tempering of metallic surfaces, in the second case surface fusion by local melting, i.e. alloy modification or surface incorporation of additional alloying elements, and also welding together. The third case is the separation or cutting through of materials.

In the majority of these cases the beam and the work piece are moved relative to each other, i.e. the beam traces a track on the surface of the work piece, while the irradiated energy and the rate of advance are so chosen that the required process temperature is reached.

Laser processing is applied with particular success to tempering or hardening of metallic surfaces. In such work the surface is heated to the desired transformation temperature by the laser beam. Since the beam moves on, the still heated surface is no longer illuminated by the beam in the next instant and the just-heated layer is suddenly cooled by the lower lying cooler layers because of the high heat conductivity of the metal. Hardening depths up to 1 mm are typically obtained, for example with a $CO_2$ laser.

The advantages of heat treatment of surfaces with laser beams are principally that the beam can easily be directed on its path without inertia into corners and angles of the work piece. The surface can also be treated in a manner limited to a particular point or locality and thus hardened only where the loads requiring hardness appear. The heat loading of the bulk material is very slight, so that no warping of the work piece takes place such as is feared in other hardening processes. In all known and technically applied processes the beam of a power laser is directed perpendicularly against the surface. The reflection of metallic surfaces in these processes is very high. With irradiation of a metallic iron surface with a $CO_2$ laser, the portion of the radiation that is reflected back from the surface typically lies at about 95%, i.e. only the remaining 5% is absorbed by the work piece and converted into heat.

In order to improve this result it is known to provide the surface to be treated with a special coating which increases the absorption of the laser radiation. Colored paint, phosphating, black finishing (like the oxidizing of gun barrels) and the like are resorted to for the provision of such coatings.

The special coating just mentioned does actually increase the absorbtion capability, but it also provides an undesired complication in further manufacture, since it must first be applied and then again removed. Since the applied surface coating, according to the nature of the surface, either burns in under laser irradiation or also melts into the material, such a removal of the coating material either involves great difficulties or is actually impossible. For certain application, therefore, such a surface coating is out of the question. Especially in the case of already fully-machined and polished parts that are ideally suited for spot surface treatment with a laser it is not possible to include a step of additionally applying and absorbing coating.

THE INVENTION

It is an object of the present invention to increase the absorbed portion of the irradiated laser energy in a surface treatment process without requiring that the surface must provided with a special coating.

Briefly, the laser beam is linearly polarized and the angle between the incident beam and the perpendicular to the surface and also the direction of the polarization vector are so selected as to maximize the ratio of absorbed to reflected energy. Preferably the direction of polarization is substantially parallel to the incidence plane of the laser beam and in the case of iron or steel surfaces the incidence angle of the laser beam is preferably a $>45°$ angle.

The invention makes use of the relation known already in basic research that the proportion of linearly polarized light that is absorbed from a certain surface, as a function of the angle of incidence and the direction of polarization vector to the plane of incidence of the ray, runs through a maximum. The application of this law of nature known already for a long time to the treatment of work piece surfaces by means of laser radiation has led to the unexpected result that with the maintainance of an optimum incidence angle and the use of light linearly polarized in a particular direction with respect to the incidence plane the absorbed energy portions become so great that as a rule all supplementary coatings of the surface can be dispensed with. Thus, it has been found, for example, that in the irradiation of an iron surface with a $CO_2$ laser at an incidence angle greater that 70°, (the angle being measured between the perpendicular and the axis of the radiation beam) the absorbed portion of the irradiated energy amounts to about 50°. The polarization direction in this case was parallel to the plane of incidence, which plane is defined as the plane that includes both the incident ray and the perpendicular to the surface that is to be treated at the point of the ray's incidence.

In the case of iron and steel the energy absorbtion percentage is already noticeably improved with an angle of incidence of 45° and the absorbtion does not fall back to level for 45° until the angle is within a few degrees of 90° (grazing incidence).

The advantages of the process of the invention are that with the elimination of any necessity of providing a special coating hardening can, for example, be carried out on already-finished machined and polished parts. The greater economy of such hardening processes is of particular significance in mass-produced articles such as are required in the automobile industry.

The process of the invention is, furthermore, also of advantage in the case of all other surface treatments by laser, since the process generally raises the proportion of the absorbed energy and thereby the efficiency. The process can advantageously be applied also to surfaces other than metallic surfaces. It is merely necessary by a simple series of experiments to determine the optimum angle of incidence and the preferred direction of the polarization vector.

THE DRAWING

The invention is further described by way of illustrative example with reference to the annexed drawing in which.

DESCRIPTION OF THE PROCESS OF THE INVENTION

Figure 1:
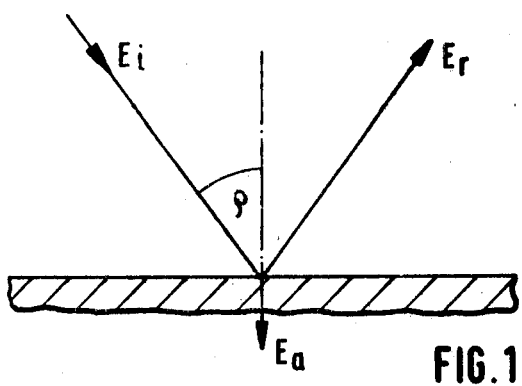
FIG. 1 is a diagram defining the angle of incidence $\rho$.

In FIG. 1 $E_i$ is the incident laser beam arriving at an angle $\rho$ from the vertical and $E_r$ is the reflectant laser beam from the treated surface. The arrow $E_a$ indicates the portion of the energy absorbed by the material. The relation holds $$E_i = E_r + E_a.$$

As already mentioned above, the optimum angle of incidence $\rho$ for iron surfaces is greater than 70°. The absorbed portion of energy reaches there a magnitude of about 50%, which corresponds roughly to the values obtained with special coatings.

Figure 2:
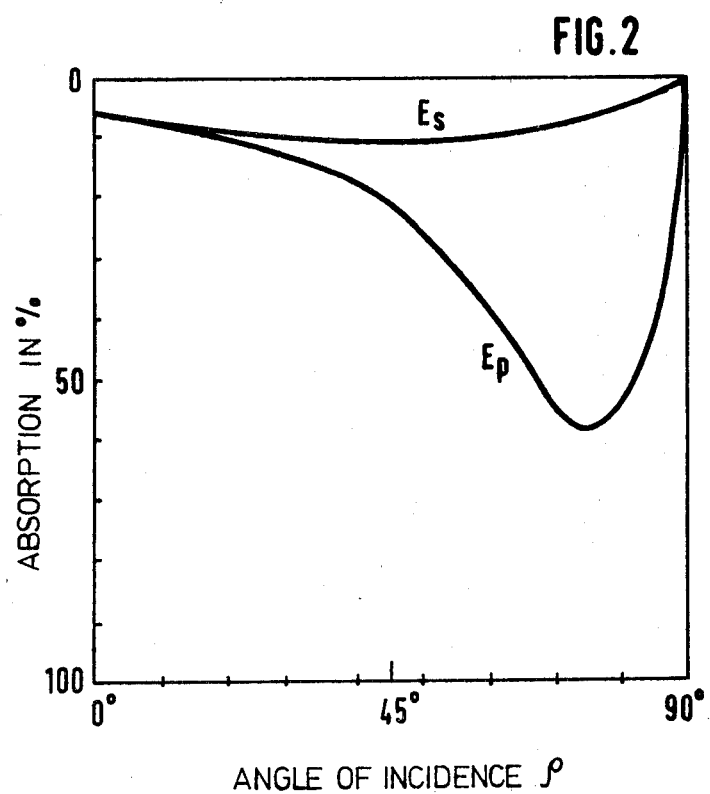
FIG. 2 is a graph which shows the percentage of absorbtion for two different cases of polarization of the laser beam as a function of the angle of incidence $\rho$.

FIG. 2 shows qualitatively the effect of the linear polarization of the laser beam. The absorbed portion of the energy is plotted in percent as ordinate, with the angle of incidence $\rho$ as defined in FIG. 1 plotted as the abscissa.

The curve $E_s$ shows the absorbed portion of the energy for the case of irradiation of an iron surface with light polarized perpendicularly to the plane of incidence, while the curve $E_p$ shows the same relation for light polarized parallel to the plane of incidence. The plane of incidence is, as mentioned above, the plane defined by the incident ray and the perpendicular to the surface at the point where the ray is incident.

It can be seen from FIG. 2 that in the case of parallel polarization a prominent maximum of the absorbed portion of the energy is found at an angle of incidence of about 80°. The relations described above for the case of irradiation of an iron surface of course vary according to the particular treatment process and material properties such as roughness, thickness of an oxide layer, surface temperature, etc. Optimization is easy for the person familiar with the laser surface treatment art to carry out by applying the teaching of this invention. The process of the invention is immediately of interest for carrying out with $CO_2$ lasers which are particularly well-suited for the field of metal treatment. The application of other lasers is in principle, likewise, possible.

Thus, it will be seen that although the invention has been described with reference to a particular illustrative example, variations and modifications are possible within the inventive concept.

We claim:

1. A process of surface heat treatment of work pieces by means of a laser beam, comprising the steps of:
    directing said laser beam to impinge on the surface to be treated at an angle of incidence greater than 45°, said angle of incidence being defined as the angle between the axis of said laser beam and the perpendicular to said surface where it is intersected by the center of said laser beam, and
    polarizing said laser beam linearly in a direction substantially parallel to the plane of incidence of the laser beam, thereby maximizing the portion of the laser beam energy absorbed by the work piece.

2. Process as defined in claim 1 in which said angle of incidence is greater than 70°.

* * * * *